United States Patent [19]

Mayenkar

[11] Patent Number: 4,565,633
[45] Date of Patent: Jan. 21, 1986

[54] REMOVAL OF DISSOLVED HEAVY METALS FROM AQUEOUS WASTE EFFLUENTS

[75] Inventor: Krishna V. Mayenkar, Glendale Heights, Ill.

[73] Assignee: Harza Engineering Company, Chicago, Ill.

[21] Appl. No.: 608,351

[22] Filed: May 8, 1984

[51] Int. Cl.$^4$ .............................................. C02F 1/42
[52] U.S. Cl. .................................... 210/688; 210/912
[58] Field of Search ................................ 210/688, 912

[56] References Cited

U.S. PATENT DOCUMENTS

| | | | |
|---|---|---|---|
| 3,317,312 | 5/1967 | Kraus et al. | 210/688 |
| 3,382,034 | 5/1968 | Kraus | 210/688 |
| 3,901,802 | 8/1975 | Peeters et al. | 210/688 |
| 4,285,819 | 8/1981 | Yen et al. | 210/688 |
| 4,377,483 | 3/1983 | Yamashita et al. | 210/688 |
| 4,405,464 | 9/1983 | Baldwin et al. | 210/912 |

FOREIGN PATENT DOCUMENTS

| | | | |
|---|---|---|---|
| 51-20468 | 2/1976 | Japan | 210/688 |
| 0059951 | 5/1977 | Japan | 210/912 |
| 0075855 | 6/1977 | Japan | 210/912 |
| 52-38346 | 9/1977 | Japan | 210/688 |
| 0115557 | 10/1978 | Japan | 210/912 |
| 0145352 | 12/1978 | Japan | 210/688 |
| 0050144 | 4/1979 | Japan | 210/688 |
| 0099192 | 4/1980 | Japan | 210/688 |
| 0049719 | 12/1980 | Japan | 210/912 |
| 0882951 | 11/1981 | U.S.S.R. | 210/688 |

*Primary Examiner*—Andrew H. Metz
*Assistant Examiner*—Terryence Chapman
*Attorney, Agent, or Firm*—Neuman, Williams, Anderson & Olson

[57] ABSTRACT

The invention relates to an environmentally-compatible process for the batchwise or continuous removal of toxic heavy metals from an aqueous effluent such as power plant wastewater. It includes the steps of activation, treating and separation. In the first step, iron in particulate form is contacted with an oxygen-containing gas such as air and an aqueous medium such as the wastewater itself under conditions providing an oxygen-water-iron interface for a period sufficient to react at least a substantial portion of the exposed iron surfaces with the oxygen and water so as to produce active surfaces on the iron particles having enhanced adsorption for the heavy metals. In the second step, without allowing the active adsorptive surfaces to dry, the particles are inundated with the aqueous effluent so as to bring about intimate contact of the aqueous effluent and adsorptive surfaces to effect adsorption of at least a substantial portion of the heavy metals on to the adsorptive surfaces. In the third step, the contacted aqueous effluent having reduced amounts of heavy metal is separated from the iron particles having heavy metals adsorbed thereon. These iron particles may then be charged to an iron or steelmaking process.

18 Claims, 4 Drawing Figures

REMOVAL OF DISSOLVED HEAVY METALS FROM AQUEOUS WASTE EFFLUENTS

BACKGROUND OF THE INVENTION

This invention relates to the subject matters of Disclosure Document No. 115,952, filed Mar. 28, 1983 and Disclosure Document No. 119,694, filed Aug. 15, 1983.

1. Field of the Invention

This invention relates to a process for reducing contaminants in wastewater effluents such as those generated by the electroplating industry or by cleaning boiler tubes in the power industry. More particularly, it relates to an environmentally-compatible, economically attractive and simplified process for removing dissolved free and chelated heavy metals from aqueous streams without formation of any by-product presenting further environmental problems.

2. Description of the Prior Art

Heavy metals such as lead, chromium, copper, zinc, cadmium, and nickel are commonly found in a variety of industrial wastewater effluents. In many industries, such as electroplating, the heavy metals in the wastewater are complexed or chelated and difficult to remove by conventional processes. Conventional chelating agents include, for example, solutions of ammonium citrate, solutions of hydrazine and ethylenediaminetetraacetic acid (ammoniated EDTA), and others known to those skilled in the art.

The United States Environmental Protection Agency (EPA) has set forth certain regulations which require pretreatment of industrial wastewaters prior to discharge to a municipal wastewater treatment plant as well as requirements for industries discharging directly to public waters. The requirements are based upon recognition of the toxic effects of heavy metals on the ecosystem, particularly aquatic organisms.

As part of its regulatory procedures, the EPA undertook studies of the economic impact of these regulations and estimated the costs for various industries based on available technology. Conventional processes for removal of heavy metals involve chemical addition to precipitate the metals and unit processes to enhance flocculation and sedimentation of the precipitant. The by-products of these processes are hydrous sludges containing 95 to 97% water. They are typically classified as hazardous wastes under current EPA criteria. Thus, the cleanup of wastewaters for ecological purposes often results in the production of still another ecological problem, i.e., disposal of the sludges. Handling and disposal of such sludges present significant cost and administrative burdens to the waste generator.

The recognized need for the purification of industrial wastewater effluents is reflected in the prior art. U.S. Pat. No. 3,027,321, for example, relates to the treatment of aqueous solutions containing toxic chromate ions by passing the solutions through a ferrous metal chip bed. Carbon dioxide is dissolved into water to create an acidic condition that is highly reactive with ferrous materials. The carbonic acid-ferrous corrosion process forms a reactive ferrous bicarbonate complex which reduces the chromate ions and results in formation of inert hydroxides of iron and chromium as precipitates which are drained off. These precipitates must then be disposed of in an environmentally acceptable manner.

U.S. Pat. No. 3,697,567 discloses a specific process for removing dissolved organic lead from an aqueous effluent produced in the manufacture of alkyl lead compounds by contacting the effluent with a metal more electropositive than lead but essentially non-reactive with water, e.g., iron, zinc, aluminum and magnesium. At least a portion of the dissolved organic lead is converted to an insoluble lead-containing product. However, this process does not address the problem of removing heavy metals that are more electropositive than the metal with which the waste is contacted.

U.S. Pat. No. 3,922,224 teaches a wastewater treating process based on electrodeposition of the toxic metal on the iron and release of iron ions which are subsequently precipitated. The effluent containing toxic heavy metals which are to be removed is passed through a bed of iron turnings, mixed with sand, the bed being agitated mechanically by a current of air bubbles. The iron is dissolved in the aqueous environment while the toxic metals are deposited on the surface of the iron and then detached from the iron by mechanical abrasion of the sand. The toxic metals are separated and recovered in the form of a metallic powder.

U.S. Pat. No. 3,960,723 relates to a process for treating aqueous waste solutions containing complexing or oxidizing agents and dissolved metallic compounds of copper, chromium, nickel, lead or tin. The waste solution is treated with finely-divided magnetized ferrous particles which are uniformly stirred, followed by the addition of material to increase the pH. The resulting metal precipitates are settled out as a sludge and separated from the waste stream for disposal. Having solved one environmental problem, disposal of the sludge creates another.

U.S. Pat. No. 4,343,706 teaches removal of various heavy metals from industrial waste streams by flocculation with ferric ions and an alkaline material at a basic pH. The flocculated heavy metals and coagulant chemicals are recovered under acidic conditions. The recovered heavy metals by this process are in a concentrated aqueous waste stream which requires further processing, still another environmental problem.

As above indicated, the primary mechanisms for heavy metal removal in these prior art processes are precipitation as an inert hydroxide and electrodeposition. The continued concern about the fate of toxic heavy metals in the environment has also led to study of the adsorptive capacity of what is believed to be ferric oxyhydroxide as a medium for removing complexed heavy metals from aqueous streams. The adsorptive capability of ferric oxyhydroxide is well documented by these studies. Favorable results have been reported, including the experimental removal of cadmium, nickel, lead, zinc and titanium. These studies are based, for example, on preparation of an hydrous metal oxide by adding a metal (iron or manganese) nitrate solution to an alkaline solution or by using commercially available goethite.

While the adsorption approach has proved encouraging, the ferric oxyhydroxides formed in these laboratory studies are in the form of dilute suspensions which, after adsorption of the heavy metals thereon, must be settled out or otherwise isolated for recovery. Moreover, a low-cost, practical embodiment thereof which uses readily available treating materials without producing a new environmental by-product problem has proved elusive.

Furthermore, any approach must lend itself to compactness, simplicity and retrofitting to small industrial units, such as small electroplating plants, which may lack adequate treating facilities and staff, usually have little sophistication in such matters and have limited financial resources to devote to the environmental consequences of their operations. Still further, because toxic streams are produced either intermittently or continuously, any treating process must also lend itself to either batch or continuous treatment. To date, these needs have not been satisfactorily fulfilled.

OBJECTS OF THE INVENTION

It is therefore a general object of the present invention to cope more adequately with the limitations of prior art approaches as set forth above.

Another general object is to provide a low-cost, practical process for reducing the heavy metal content of aqueous streams.

Another object is to provide an economically-attractive, industrially-feasible process for removing a variety of heavy metals in various forms from an aqueous stream such that the treated water has significantly less heavy metals and no waste by-product is formed.

Another object is to provide a low-cost process for reducing the heavy metal content of aqueous streams by a process free of the limitations and problems inherent in processes relying upon precipitation or electrodeposition.

Another object is to provide an efficient means of removing free and complexed heavy metals from aqueous streams without expensive chemical addition and process control and without the generation of a hazardous sludge of metal precipitates.

Another object is to provide a simplified process for the treatment of toxic-metal-containing streams employing low-cost adsorption techniques without adding substantial amounts of chemicals, or employing techniques requiring settling or other isolating steps and without producing any undesired by-product.

Another object is to provide an industrial effluent purification process using a readily-available purification medium without adversely affecting its suitability for other use.

Another object is to provide a suitably compact and relatively-simple process which can readily be adopted by, or retrofitted to, small industry, such as an electroplater, without undue financial burden.

Still another object is to provide industries which have batch discharges, such as effluents resulting from cleaning boiler tubes, a simple process to remove chelated nickel, chelated copper, and iron from the batch discharge of wastewater.

A further object is to provide a process for decreasing the heavy metal content of industrial aqueous streams using inexpensive and readily-available iron filings as the starting medium without adversely affecting the usability or suitability of the spent iron as a raw material (recycled scrap) in the iron or steelmaking industry.

A still further object is to reduce the heavy metal content of industrial streams without producing a hazardous or toxic by-product by a highly-efficient, simplified process which uses iron filings from the metal finishing industry; requires minimal manpower, control and energy usage; and permits using the spent iron treating medium with adsorbed heavy metals as a charge to an iron or steelmaking operation.

These and other objects of the present invention will become apparent from the description hereinafter set forth.

SUMMARY OF THE INVENTION

These objects are achieved by treating the aqueous effluent containing the heavy metals in a simple, two-step process wherein the raw material is readily-available iron in particulate form, e.g., degreased iron filings from the metalworking industry. The first or activation step comprises contacting the iron filings simultaneously with oxygen and water to produce active surfaces thereon having enhanced adsorption for the heavy metals. Without allowing the adsorptive surfaces to dry, the iron particulates are then employed in the second step, which comprises inundating the iron particulates in the aqueous effluent. This brings about intimate contacting of the effluent and adsorptive surfaces and adsorption of the heavy metal thereon.

Since the iron particulates are not suspended in the effluent, separation is readily accomplished by flow-through or draining techniques or the like. After the purified aqueous effluent is separated, the iron filings with adsorbed heavy metals on the surfaces may be charged without further treatment as a raw material to an iron or steelmaking process. An environmentally-enhanced effluent is thereby produced without any substantial undesired by-product.

With respect to the first or activation step, the aqueous effluent or wastewater to be treated is adjusted, if necessary, to a pH in the range of about 6 and 10, preferably about 7 to 9.5, optimally about 8 to 9. This is readily achieved by treating an acidic effluent with a suitable base or treating a basic effluent with a suitable acid. Should the pH adjustment produce excessive precipitation or solids, the wastewater can be clarified by settling, decantation, or filtration. Such preparation steps are usually only necessary when employing a bed of iron filings and flow-through conditions wherein the solids content of the effluent may be substantial enough to clog the bed.

While the process is not temperature critical, the wastewater should be in the range of about 40° F. to 140° F., preferably about 50° F. to 100° F., optimally about 60° F. to 70° F. In practice, temperature adjustment is usually not necessary.

In the first or activation step, the particulates to be activated should contain at least about 50% iron in an unoxidized form, the higher the iron content the better. Iron fines from metalworking operations, such as would otherwise be recycled as scrap to an iron or steelmaking operating, are preferred. The iron particulates should have a size small enough to provide a high order of exposed surfaces for activation and yet large enough so that in a typical flow-through process the bed will not be clogged readily by compaction of the particles.

The lower limit on particle size may also be dictated by the need to minimize entrainment in the flowing wastewater and permit ease of separation of the wastewater and particulates. In practice, we prefer iron particles wherein at least a substantial portion, i.e., 50% or more, will have a mesh in the range of about 2½ to 200 (U.S. Standard Sieve Series), preferably about 10 to 80, optimally about 35 to 45.

It is believed that the form of adsorptive iron oxide produced by the critical activation step is ferric oxyhydroxide. Because the particular adsorptive iron oxide or oxides has not been defined with particularity, the process should not be considered limited thereto. Further analyses may determine that iron compounds other than ferric oxyhydroxides are sufficiently adsorptive to be operative.

While the activation step requires the contact of oxygen, water and iron, this is very simply accomplished using ambient air and the wastewater effluent itself as the source of oxygen and water, although the process manifestly is not limited thereto. In practice, the activation step is very simply carried out by slowly passing the wastewater upwardly through the bed of iron filings in the presence of ambient air whereby the iron-oxygen-water interface and the formation of ferric oxyhydroxide surfaces progressively occurs.

The contact time for the activation depends upon a number of variables, including the particle size of the iron filings, the temperature and pH of the water, the air temperature, and the like. It is best determined empirically. In general, satisfactory results may be obtained in beds containing iron filings having a particle size of about 40 mesh by allowing the wastewater to rise slowly through the bed of iron filings in the presence of air at the rate of about 0.5 inch per hour to 4 feet per hour, preferably about 1 inch per hour to 2 feet per hour.

In general, the longer (or slower) the activation period the better. A practical consideration, however, is the possible and undesired rusting of iron particles towards the top of the bed if the iron-water-oxygen interface rises through the bed too slowly.

Once the active or adsorptive oxides have been formed, presumably ferric oxyhydroxide, it is important that the activated bed be kept flooded with water at all times to ensure that the adsorptive surface is not converted to stable, non-adsorptive ferric oxide or rust. One technique for assuring that the activated iron bed remains sufficiently wet at all times is to flow water from below the bed upwardly through the bed and to draw it off above the bed, as will become more apparent hereinafter.

After activation of the iron particulates, the second step involves intimately contacting the adsorptive surfaces with the aqueous effluent or wastewater to be purified. Adsorption of the heavy metals rapidly occurs. To enhance pickup, the aqueous effluent should be at the same conditions as the water used in the activation step; that is, a temperature in the range of about 40° F. to 140° F., preferably 50° F. to 100° F., optimally about 60° F. to 70° F., and a pH in the range of about 6 to 10, preferably 7 to 9.5, optimally about 8 to 9.

With intimate contact of the wastewater and activated iron filings, dissolved toxic and heavy metals such as copper, nickel, arsenic, hexavalent chromium, lead, cadmium, mercury, zinc and even iron are rapidly removed by adsorption. In contrast, in processes without the initial activation step as above described, the adsorption of the heavy metals proceeds much more slowly. The adsorption rates of the present invention differ by kind, rather than degree.

Some ferric oxide particles may be carried over by the contacted wastewater and can be removed by passing the watewater through a multi-media filter.

But even with the improvement of the present invention, the wastewater contact time with the adsorptive surfaces for nearly complete heavy metal removal may vary between about 10 minutes to 2 hours, depending primarily upon the type of heavy metal present. Lead and cadmium, for example, require longer contact times; while iron, nickel, copper, mercury, arsenic, chromium and zinc are removed with substantially shorter contact periods, e.g., about 20 minutes.

As the wastewater continues to pass through the bed of iron particulates, the adsorption capacity of the bed gradually decreases as a result of exhaustion of active adsorption surface areas by adsorbed metal molecules. When the adsorption rate of the bed is reduced to a level such that the dissolved metal concentrations in the treated wastewater exceeds the acceptable limits, the bed may be replaced with fresh iron particles and the two-step process then being repeated.

With respect to the amount of iron filings to be employed, preliminary results indicate that with particles having a size of about 40 mesh, at least about 50 pounds of iron particulates per pound of heavy metals adsorbed is required, preferably at least about 100 pounds per pound, typically about 100 to 1000 pounds per pound. As will become apparent, the process may be operated batchwise or continuously.

The spent iron particles with adsorbed heavy metals can be readily disposed of by shipping them to iron or steelmaking manufacturing industries for use in the same manner as they would have been used if not employed in the practice of the present invention, i.e., as a raw material, e.g., recycled scrap. The contaminant level, i.e., adsorbed heavy metals, resulting from use in the present process, is so low that it does not materially affect the product from the iron or steelmaking process. In fact, such contaminants are already present in such products, oftentimes at levels far exceeding the amounts added by charging the spent iron particulates of the present invention.

As above indicated, upon bed exhaustion, the spent iron particles may be replaced with fresh iron particles and the process is repeated. Manifestly, a plurality of beds of iron particles may be employed, either in series or parallel-flow relationship. In a series operation, the toxic metal content is progressively lowered. With multiple beds, a continual flow operation may be employed wherein spent beds may be withdrawn for replenishment while the remaining beds continue to process the wastewater effluent.

Recycling of the treated effluent may also be employed to achieve the required degree of heavy metal removal. This may be particularly desirable in those instances where the contaminants include heavy metals requiring longer contact times for adsorption e.g., lead and cadmium.

An important aspect of the process is the fact that the adsorptive surfaces with the adsorbed heavy metals are part of the iron particulates. These are of sufficient size to be readily separable from the treated wastewater. No special precipitation, settling, concentrating or deflocculating steps are necessary. The treated effluent is simply passed through or drained away from the iron particulates. Thus, the simplified process lends itself to simplified disposal of the heavy metals by charging the spent iron particulates to iron or steelmaking operations, as already described.

BRIEF DESCRIPTION OF THE DRAWINGS

The present invention may be more clearly understood from the following detailed description of specific and preferred embodiments read in conjunction with the accompanying drawings, wherein.

The present invention and advantages thereof will be further apparent from the following specific examples.

It should be understood that the drawings are not necessarily to scale and that certain aspects of the depicted embodiments are illustrated by graphic symbols and diagrammatic or schematic representations for ease of understanding. In certain instances, mechanical details which are not necessary for an understanding of the present invention or which render other details difficult to perceive have been omitted or symbolically represented. These details are well within the skill of the art. It should be understood, of course, that the invention is not necessarily limited to the particular embodiments illustrated herein.

DETAILED DESCRIPTION OF THE DRAWINGS

Figure 1:
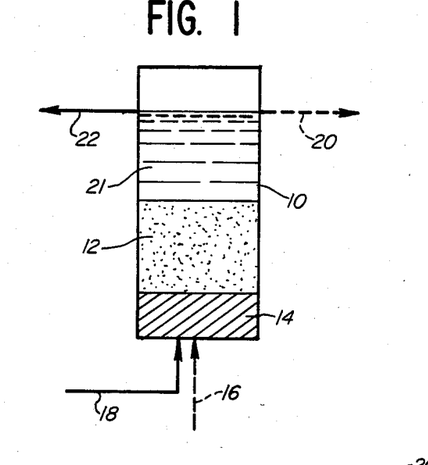
FIG. 1 schematically represents a single treating vessel for practice of the present invention wherein the aqueous medium for the activation step and the contaminated aqueous stream to be treated are introduced at the bottom and drawn off at the top.
Figure 2:
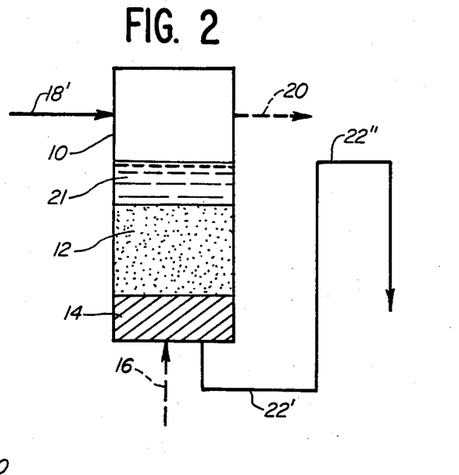
FIG. 2 is similar to FIG. 1 except that the contaminated aqueous stream is introduced at the top.
Figure 3:
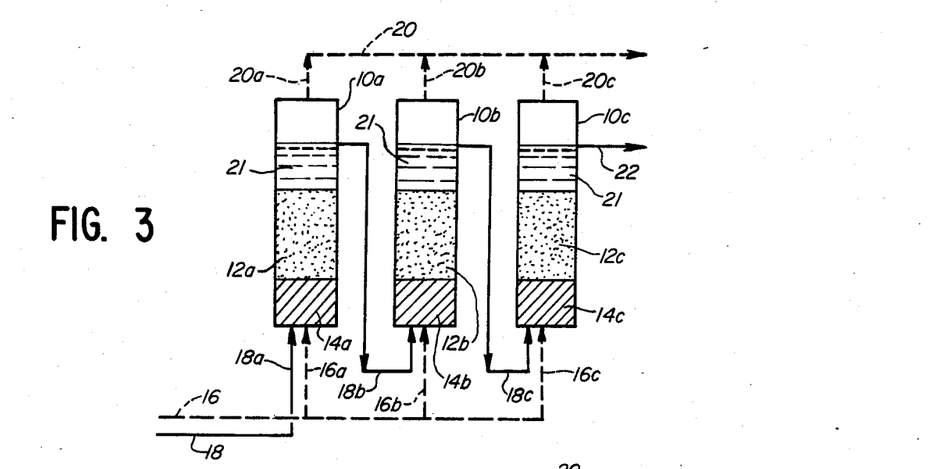
FIGS. 3 and 4 are also similar to FIG. 1 except that they depict multiple treating vessels piped for series and parallel treating operations, respectively.
Figure 4:
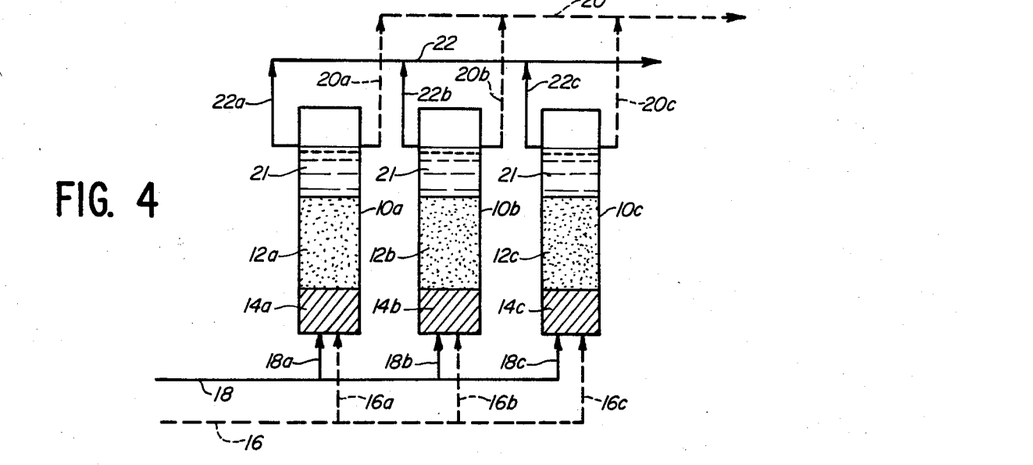

FIGS. 1 and 2 schematically represent two process modes. FIGS. 3 and 4 schematically represent two operational modes which are possible for each of the two process modes.

Referring specifically to FIG. 1, treating vessel or column 10 is typically a cylindrical vessel fabricated from inert materials having the requisite structural properties. Materials of construction may be concrete; stainless steel; plastic-lined, glass-lined or ceramic-lined steel; reinforced plastic; wood or the like. In a low-cost embodiment, it may simply comprise a plastic-lined 55-gallon drum or the like.

Vessel 10 contains a bed of iron filings 12 supported on a porous medium 14 in the presence of ambient air. Vessel 10 may be open-topped to assure an adequate air supply and permit air displacement as the vessel is filled. During the activation step the air is displaced, at least to the level of the outlets, by the aqueous activation medium introduced via line 16. The porous support medium may simply comprise a bed of sand which will also serve to remove solid particles present in the upflowing liquids introduced into the vessel through bottom inlet lines 16 and 18. The inlet connections are, of course, screened to support the porous medium 14 and prevent backflow or downflow thereof.

In a preferred embodiment, the aqueous medium for the activation step comprises water preferably at a temperature of about 50° F. to 100° F. and a pH of about 7 to 9.5. It enters vessel 10 via line 16, passes through the porous support medium 14 at a controlled rate and exits via line 20. The rate of introduction of the aqueous medium to vessel 10 is controlled whereby its level slowly rises in bed 12 at the preferred rate of about 1 inch per hour to 2 feet per hour, e.g., 1 foot per hour.

The iron filings in bed 12 are substantially pure iron having a mesh size in the range of about 10 to 80 (U.S. Sieve Series). As will be apparent from Example 4 hereinafter, cast iron filings having as little as 60% iron content are also operative with some lowering of efficiency. Iron contents less than about 50% are not recommended, although partially operative.

Because vessel 10 contains atmospheric air at the commencement of the activation cycle, an iron, water, oxygen interface is present at the surface of the slowly rising liquid. A reaction takes place at the interface whereby surfaces adsorptive to heavy metals are progressively produced on the iron filings. These are believed to be primarily ferric oxyhydroxide.

After the level of the aqueous medium reaches the top of the bed of iron filings and the entire bed is activated, addition of the aqueous medium is continued so that the bed remains submerged and the aqueous medium is drained off via line 20 near the top. Submerging or inundating the activated bed, as indicated by the aqueous liquid 21, prevents the adsorptive surfaces from drying and converting to the relatively-non-adsorptive ferric oxide.

Upon completion of the activation step, the addition of the aqueous medium is terminated and wastewater effluent containing the heavy metals to be removed enters vessel 10 via line 18. It should preferably be at the same temperature and pH as the activating aqueous medium, as above set forth. In the embodiment of FIG. 1, the wastewater also rises through the bed and exits via line 22 adjacent the top. Heavy metals are adsorbed from the wastewater as it passes through the bed and the process is continued until the adsorptive surfaces become exhausted. The exhausted bed with heavy metals adsorbed thereon is removed and charged to an iron or steelmaking operation (not shown) as scrap raw material. Bed 12 is replenished with fresh iron filings, and the process is repeated.

Manifestly, a simplified and attractive embodiment of the present invention involves the use of the wastewater itself as the aqueous medium used in the activation step. Thus, only one inlet line need be installed at the bottom, and one withdrawal line installed adjacent the top. The wastewater thus initially activates the bed under controlled conditions and thereafter is treated or purified by the adsorptive surfaces produced during such activation.

In FIG. 2, the operation is similar except that the wastewater to be treated enters via line 18' at the top and leaves via line 22' at the bottom, that is, a downflow operation. To assure that the activated bed remains inundated, so that it will not dry out and revert to relatively-non-adsorptive ferric oxide, line 22' has a portion 22" with a level higher than that of bed 12.

In FIG. 3, beds 12a, 12b and 12c in vessels 10a, 10b and 10c are individually activated in parallel relationship, employing an aqueous medium from manifold 16 which is introduced via lines 16a, 16b and 16c. The aqueous medium exits via lines 20a, 20b and 20c to manifold 20.

The wastewater to be treated from line 18 enters vessel 10a via line 18a and after initial treatment therein is charged serially to vessels 10b and 10c via lines 18b and 18c. The treated wastewater then exits via line 22. In this operation, the heavy metal content of the wastewater is gradually reduced as it passes from bed to bed. Crossover piping (not shown) permits any one of vessels 12a, 12b and 12c to be removed from the operation for replacement of the bed of exhausted iron filings, which may then become a scrap charge to a steelmaking operation. Meanwhile, the treatment continues in the remaining beds. This arrangement permits continuous operation of the process.

In the parallel arrangement of FIG. 4, the operation in each treating vessel 10a, 10b and 10c is substantially the same as that already described in connection with FIG. 1. If the tops of the vessels were closed, precautions should be taken during the activation step to assure that sufficient air (oxygen) is present to form the adsorptive ferric oxyhydroxide, e.g., installation of openable air inlets in the upper portions of the vessels. Such precautions apply to all process embodiments wherein ambient air may be limited, as those skilled in the art will recognize.

The aqueous activating medium enters from manifold 16 to each of the vessels via lines 16a, 16b and 16c and, after activation of beds 12a, 12b and 12c, exits therefrom via lines 20a, 20b and 20c and manifold 20. Similarly, the wastewater to be treated enters vessels 10a, 10b and 10c from manifold 18 via lines 18a, 18b and 18c and after treatment (heavy metals removed), exits from vessels 10a, 10b and 10c via lines 22a, 22b and 22c, respectively, to outlet manifold 22. If wastewater is to be used for the activation step, the separate inlet piping 16 and 18 can be combined, and, similarly, the separate outlet piping 20 and 22 can be combined.

The series and parallel arrangement shown in FIGS. 3 and 4, respectively, employ bottom feeding of both the aqueous medium for the activation step and the wastewater to be treated. Manifestly, top feeding of the wastewater, as illustrated in FIG. 2, could also be employed in a series or parallel arrangement by appropriate piping arrangements which are readily apparent to one skilled in the art.

While in FIGS. 3 and 4 three vessels are illustrated, the invention is not limited thereto. Two or more than three vessels may also be used as dictated by process requirements, the type and quantity of heavy metals to be removed, and the like. Moreover, a combination of beds in series and parallel flow relationship may also be employed should such appear advantageous in a given situation.

The process also lends itself to batch operation. Thus, for example, in FIG. 1, the bed may be activated via introduction of the aqueous medium or wastewater through line 16 and slowly flowing it upwardly through the bed in the presence of air, as already described. Once the bed is activated and inundated, the wastewater (or additional wastewater) may be introduced from the top or bottom and purified batchwise, as those skilled in the art will recognize.

The present invention will be more clearly understood from the following specific examples.

EXAMPLE 1

Initial batch type studies, not including the activation step described herein, were conducted using iron filings and a metal cleaning wastewater containing ammoniated EDTA chelating agent and generated in a coal-fired steam generating station. The purpose was to determine the effects of process variables such as type of contact mode, weight to volume ratio of iron filings and wastewater, wastewater dilution and wastewater temperature on the rate of chelated nickel, copper, and iron removals. All the batch tests were conducted with instant wetting of the iron filings by the wastewater, that is, without the activation step.

The results of the study and conclusions reached are presented in said Disclosure Document No. 119,694, filed Aug. 15, 1983, and incorporated by reference herein. In general, the required contacting times were very long and the metal removal efficiency so low that the technique lent itself only to situations wherein wastewaters are generated a few times a year.

EXAMPLE 2

A batch study, not including the activation step described herein, was conducted to determine process capabilities to remove certain toxic metals-lead, cadmium, hexavalent chromium, arsenic, nickel, copper and iron. A wastewater was simulated by adding solutions of lead acetate, cadmium acetate, arsinilic acid and chromic acid to the same metal cleaning wastewater generated in a coal-fired steam generating plant and containing ammoniated EDTA chelating agent, which was employed in Example 1. The wastewater pH was 8.7 at the beginning of the test.

This wastewater was poured into a column containing 40 mesh iron filings, instantly wetting and submerging the filings without an activation step. The wastewater and iron filings were contacted for a period of 211 hours. Iron filings to wastewater ratio was maintained at 5.4 grams of filings to 1 milliliter of wastewater. Contacted wastewater was withdrawn from the reaction column at several time intervals, filtered and analyzed for soluble metals. The results are shown in Table 1. The data establish that for a high degree of removal of heavy metals, the contact times are extremely long.

TABLE 1

| Contact Time, Hours | 0 | 24 | 48 | 120 | 211 |
|---|---|---|---|---|---|
| Treated Water pH | 8.7 | 9.2 | 9.2 | 9.3 | 9.2 |
| Dissolved Metals, Concentrations, Milligrams per liter | | | | | |
| Iron | 182 | 40.7 | 42.9 | 27.5 | 23 |
| Copper | 29.2 | 1.83 | 0.817 | 0.140 | 0.011 |
| Nickel | 3.4 | 3.0 | 4.2 | 2.6 | 0.2 |
| Lead | 12.9 | 0.92 | 0.43 | 0.21 | 0.11 |
| Cadmium | 7.79 | 0.674 | 0.392 | 0.171 | 0.061 |
| Chromium$^{+6}$ | 10.9 | 0.402 | 0.155 | 0.084 | 0.029 |
| Arsenic | 0.66 | 0.11 | 0.05 | 0.09 | 0.021 |

EXAMPLE 3

A batch study, not including the activation step described herein, was conducted essentially as described in Example 2, except that the wastewater pH was adjusted to 7.0 by the addition of 1N sulfuric acid. The wastewater was contacted with iron filings for a period of 120 hours. Contacted wastewater was withdrawn from the reaction column at several time intervals, filtered, and analyzed for soluble metals. Results of the test are shown in Table 2. Metal removal efficiencies at pH 7.0 were slightly lower than those observed in Example 2 in which initial wastewater pH was 8.7. Thus, for the same degree of heavy metals removal, the contact time had to be even longer.

TABLE 2

| Contact Time, Hours | 0 | 24 | 48 | 120 |
|---|---|---|---|---|
| Treated Water pH | 7.0 | 9.0 | 9.2 | 9.2 |
| Dissolved Metals, Concentrations, Milligrams per liter | | | | |
| Iron | 147 | 67 | 53 | 42 |
| Copper | 25.4 | 7.23 | 2.34 | 0.311 |
| Nickel | 3.4 | 2.5 | 3.0 | 2.6 |
| Lead | 11.6 | 3.71 | 1.40 | 0.48 |
| Cadmium | 6.73 | 2.36 | 0.868 | 0.349 |
| Chromium$^{+6}$ | 8.24 | 1.79 | 0.207 | 0.113 |

| TABLE 2-continued | | | | |
|---|---|---|---|---|
| Arsenic | 5.5 | 1.8 | 0.83 | 0.51 |

EXAMPLE 4

Side-by-side experiments were performed using continuous flow of wastewaters through beds containing 40 mesh pure iron and scrap cast iron filings supported in glass columns having a diameter of 5.9 centimeters and a height of 30 centimeters. These experiments differed from Examples 1, 2 and 3 in that the latter were batch type operations with instantaneous wetting (no activation) of the iron bed, followed by a long contact period varying between 24 to 456 hours.

In contrast, the experiments of this example were conducted by a controlled initial wetting of iron filings in the columns by upward wastewater flow so as to produce adsorptive surfaces on the iron filings. This was followed by a continuous flow of wastewater through the wetted columns at the same rate used during the activation step. In addition to the toxic heavy metals removed in Examples 2 and 3, zinc removals were also studied.

The wastewater was simulated by adding solutions of lead acetate, cadmium acetate, zinc acetate, arsinilic acid and chromic acid to the metal cleaning wastewater used in Example 1. The pH of the wastewater was then adjusted to 7.0 by the addition of 1N sulfuric acid. Four reaction beds were prepared, three containing pure 40 mesh iron filings and one containing 40 mesh scrap cast iron filings having 60% iron and 40% slag material. Each of the three iron filing-reaction beds were filled with different amounts of iron filings to vary the contact time between the wastewater and filings. One column had 100 cubic centimeters; the second column had 275 cubic centimeters; and the third column had 510 cubic centimeters of iron filings. The fourth column with scrap cast iron filings had 103 cubic centimeters of filings.

After activation of the filings in each column, simulated wastewater was passed upwardly through the columns from the bottom at a rate of 0.75 milliliters per minute. This flow rate provided a contact time of 1.11 hours in column 1, 3.05 hours in column 2, and 5.67 hours in column 3. In the column containing scrap cast iron filings, the contact time was 1.14 hours. Approximately 150 milliliters of contacted water from the columns were collected, filtered, and analyzed for metals. The results are shown in Table 3.

TABLE 3

| | | | | | |
|---|---|---|---|---|---|
| Contact Time, Hours | 0 | 1.11 | 3.05 | 5.67 | 1.4 |
| Treated Water pH | 7 | 9.0 | 9.2 | 8.3 | 9.2 |
| Dissolved Metals Concentrations, Milligrams per liter | | | | | |
| Iron | 152 | 1.93 | 0.06 | 0.01 | 62 |
| Copper | 25.8 | 0.011 | 0.008 | 0.003 | 0.787 |
| Nickel | 3.5 | 0.033 | 0.05 | 0.01 | 2.9 |
| Lead | 11.4 | 0.01 | 0.01 | 0.01 | 4.58 |
| Cadmium | 6.66 | 0.052 | 0.001 | 0.001 | 2.51 |
| Chromium$^{+6}$ | 8.36 | 0.01 | 0.001 | 0.001 | 0.091 |
| Arsenic | 5.5 | 0.008 | 0.001 | 0.001 | 0.004 |
| Zinc | 10.6 | 0.079 | 0.024 | — | 10.0 |

When contrasted with the data of Examples 1, 2 and 3, these data establish an improvement of kind, not degree, in heavy metals removal efficiency. With activation of the bed, toxic metal removals of 98.7% to 99.9% are attained within as short a contact time as 1.11 hours. Without the activation step, the data of Examples 1, 2 and 3 establish that such high percentage of metal removals were not attained in spite of contact periods of more than 200 hours.

This example also illustrates that scrap cast iron filings with only 60% iron content can be effective in removing heavy metals, albeit at a lower efficiency.

EXAMPLE 5

Two identical treatment units were started up side by side. Each unit had a reaction column containing 1950 grams of iron filings. Two types of wastewater were simulated, each containing different concentrations of the same heavy metals, one having a pH of 7.8 and the other a pH of 8.5. In this example, removal of mercury, in addition to other metals tested in Example 4, was also studied.

The wastewaters were continuously passed through the two reaction columns at a rate of 0.81 milliliters per minute providing activation and contact periods of 6.7 hours for each of the two systems. Contacted water samples were collected from each system, filtered and analyzed for dissolved metal for a period of eight days. Approximately 7.5 liters of wastewater was passed through the system. The last run was conducted by increasing the flow rate to 15.2 milliliters per minute, thereby reducing the contact period between iron filings and the wastewater to 21.4 minutes.

The results of the tests for each system are presented in Tables 4 and 5, respectively. In each table, the data in the first four columns at the top apply to all nine sets of data for the nine heavy metals studied.

TABLE 4

| Day | Volume Treated | Cumulative Volume Treated | pH | Dissolved Iron | | | Dissolved Nickel | | | Dissolved Copper | | |
|---|---|---|---|---|---|---|---|---|---|---|---|---|
| | | | | mg/l | mg | mg | mg/l | mg | mg | mg/l | mg | mg |
| 1 | 0 | 0 | 7.8 | 58 | 0 | 0 | 1.5 | 0 | 0 | 19.4 | 0 | 0 |
| 2 | 125 | 125 | 8.1 | <0.01 | 7.25 | 7.25 | <0.01 | 0.19 | 0.19 | <0.001 | 2.43 | 2.43 |
| 3 | 844 | 969 | 9.05 | 0.07 | 48.9 | 56.15 | 0.09 | 1.19 | 1.38 | <0.001 | 16.37 | 18.8 |
| 4 | 788 | 1757 | 8.9 | 34 | 18.91 | 75.05 | 0.27 | 0.97 | 2.35 | <0.001 | 15.29 | 34.09 |
| 5 | 530 | 2287 | 8.75 | 45 | 6.89 | 81.95 | 1.0 | 0.27 | 0.97 | <0.001 | 10.28 | 44.37 |
| 6 | 1565 | 3852 | 8.8 | 45 | 20.35 | 102.30 | 1.5 | 0 | 2.62 | <0.001 | 30.36 | 74.73 |
| 7 | 1932 | 5784 | 8.7 | 54 | 7.73 | 110.03 | 1.5 | 0 | 2.62 | <0.001 | 37.48 | 112.21 |
| 8 | 790 | 6574 | 8.75 | 55 | 2.37 | 112.40 | 1.6 | 0 | 2.62 | <0.001 | 15.33 | 127.54 |
| 8* | 920 | 7494 | 8.65 | 66 | 0 | 112.40 | 1.6 | 0 | 2.62 | <0.001 | 17.85 | 145.39 |

| | Volume | Cumulative Volume | | Dissolved Lead | | | Dissolved Camdium | | | Dissolved Chromium$^{+6}$ | | |
|---|---|---|---|---|---|---|---|---|---|---|---|---|

TABLE 4-continued

| Day | Treated | Treated | pH | mg/l | mg | mg | mg/l | mg | mg | mg/l | mg | mg |
|---|---|---|---|---|---|---|---|---|---|---|---|---|
| 1 | 0 | 0 | 7.8 | 1.51 | 0 | 0 | 13.3 | 0 | 0 | 17.0 | 0 | 0 |
| 2 | 125 | 125 | 8.1 | <0.01 | 0.19 | 0.19 | 0.004 | 1.66 | 1.66 | 0.005 | 2.12 | 2.12 |
| 3 | 844 | 969 | 9.05 | <0.01 | 1.27 | 1.46 | 0.003 | 11.23 | 12.89 | 0.017 | 14.34 | 16.46 |
| 4 | 788 | 1757 | 8.9 | <0.01 | 1.18 | 2.64 | 0.003 | 10.48 | 23.37 | 0.031 | 13.37 | 29.83 |
| 5 | 530 | 2287 | 8.75 | <0.01 | 0.8 | 3.44 | 0.003 | 7.05 | 30.42 | 0.021 | 9.00 | 38.83 |
| 6 | 1565 | 3852 | 8.8 | <0.01 | 2.35 | 5.79 | <0.001 | 20.81 | 51.23 | 0.039 | 26.61 | 65.44 |
| 7 | 1932 | 5784 | 8.7 | <0.01 | 2.90 | 8.69 | <0.001 | 25.70 | 76.93 | 0.031 | 32.84 | 98.28 |
| 8 | 790 | 6574 | 8.75 | <0.01 | 1.19 | 9.88 | <0.001 | 10.51 | 87.44 | 0.034 | 13.43 | 111.71 |
| 8* | 920 | 7494 | 8.65 | 2.83 | 0 | 9.88 | 7.35 | 7.35 | 92.91 | 0.034 | 15.64 | 127.35 |

| Day | Volume Treated | Cumulative Volume Treated | pH | Dissolved Arsenic | | | Dissolved Mercury | | | Dissolved Zinc | | |
|---|---|---|---|---|---|---|---|---|---|---|---|---|
| | | | | mg/l | mg | mg | mg/l | mg | mg | mg/l | mg | mg |
| 1 | 0 | 0 | 7.8 | 1.2 | 0 | 0 | 0.3 | 0 | 0 | 7.73 | 0 | 0 |
| 2 | 125 | 125 | 8.1 | 0.001 | 0.15 | 0.15 | 0.0009 | 0.037 | 0.037 | 0.019 | 0.96 | 0.96 |
| 3 | 844 | 969 | 9.05 | 0.002 | 1.01 | 1.16 | 0.0009 | 0.253 | 0.29 | 0.014 | 6.51 | 7.47 |
| 4 | 788 | 1757 | 8.9 | <0.001 | 0.95 | 2.11 | <0.0005 | 0.236 | 0.526 | 0.061 | 6.04 | 13.51 |
| 5 | 530 | 2287 | 8.75 | <0.01 | 0.64 | 2.75 | 0.016 | 0.16 | 0.686 | 0.036 | 4.08 | 17.59 |
| 6 | 1565 | 3852 | 8.8 | <0.001 | 1.88 | 4.63 | <0.0005 | 0.47 | 1.156 | 0.073 | 11.98 | 29.57 |
| 7 | 1932 | 5784 | 8.7 | <0.001 | 2.32 | 6.95 | <0.0005 | 0.58 | 1.736 | 0.039 | 14.86 | 44.43 |
| 8 | 790 | 6574 | 8.75 | <0.001 | 0.95 | 7.90 | <0.0005 | 0.24 | 1.976 | 0.037 | 6.08 | 50.51 |
| 8* | 920 | 7494 | 8.65 | <0.001 | 1.10 | 9.00 | <0.0005 | 0.28 | 2.256 | 0.228 | 6.90 | 57.41 |

*This run was conducted by increasing the flow rate on the eigth day to 15.2 milliliters per minute, thereby providing a contact time of 21.4 minutes. The balance of the runs were conducted at a contact time of 6.7 hours.

TABLE 5

| Day | Volume Treated | Cumulative Volume Treated | pH | Dissolved Iron | | | Dissolved Nickel | | | Dissolved Copper | | |
|---|---|---|---|---|---|---|---|---|---|---|---|---|
| | | | | mg/l | mg | mg | mg/l | mg | mg | mg/l | mg | mg |
| 1 | 0 | 0 | 8.5 | 151 | 0 | 0 | 3.4 | 0 | 0 | 23.5 | 0 | 0 |
| 2 | 125 | 125 | 8.9 | <0.01 | 18.88 | 18.88 | 0.01 | 0.43 | 0.43 | <0.001 | 2.94 | 2.94 |
| 3 | 838 | 963 | 9.25 | 56 | 79.61 | 98.49 | 0.64 | 3.31 | 2.74 | 0.004 | 19.69 | 22.63 |
| 4 | 793 | 1756 | 9.05 | 117 | 26.96 | 125.45 | 2.8 | 0.48 | 3.22 | <0.001 | 18.64 | 41.27 |
| 5 | 545 | 2301 | 9.00 | 117 | 18.53 | 143.98 | 3.1 | 0.16 | 3.38 | <0.001 | 12.81 | 54.08 |
| 6 | 1610 | 3911 | 9.00 | 116 | 56.35 | 200.33 | 3.1 | 0.48 | 3.86 | <0.001 | 37.84 | 91.92 |
| 7 | 1887 | 5798 | 8.95 | 129. | 41.51 | 241.84 | 3.1 | 0.57 | 4.43 | <0.001 | 44.34 | 136.26 |
| 8 | 790 | 6588 | 8.95 | 136 | 11.85 | 253.69 | 3.3 | 0.08 | 4.51 | <0.001 | 18.56 | 154.82 |
| 8* | 920 | 7508 | 8.90 | 144 | 6.44 | 260.13 | 3.3 | 0.09 | 4.60 | <0.001 | 21.62 | 176.44 |

| Day | Volume Treated | Cumulative Volume Treated | pH | Dissolved Lead | | | Dissolved Cadmium | | | Dissolved Chromium$^{+6}$ | | |
|---|---|---|---|---|---|---|---|---|---|---|---|---|
| | | | | mg/l | mg | mg | mg/l | mg | mg | mg/l | mg | mg |
| 1 | 0 | 0 | 8.5 | 9.17 | 0 | 0 | 13.1 | 0 | 0 | 18.8 | 0 | 0 |
| 2 | 125 | 125 | 8.9 | <0.01 | 1.15 | 1.15 | 0.005 | 1.65 | 1.65 | 0.069 | 2.43 | 2.43 |
| 3 | 838 | 963 | 9.25 | 0.05 | 7.64 | 8.79 | 0.006 | 11.06 | 12.71 | 0.036 | 15.72 | 18.06 |
| 4 | 793 | 1756 | 9.05 | 0.05 | 7.23 | 16.02 | 0.004 | 10.47 | 23.18 | 0.068 | 14.86 | 32.92 |
| 5 | 545 | 2301 | 9.00 | <0.01 | 5.00 | 21.06 | 0.005 | 7.19 | 30.37 | 0.065 | 10.21 | 43.13 |
| 6 | 1610 | 3911 | 9.00 | 0.26 | 14.35 | 35.37 | 0.008 | 21.25 | 51.62 | 0.063 | 30.17 | 73.30 |
| 7 | 1887 | 5798 | 8.95 | <0.01 | 17.30 | 52.67 | 0.214 | 24.50 | 76.12 | 0.073 | 35.34 | 108.64 |
| 8 | 790 | 6588 | 8.95 | <0.01 | 7.24 | 59.91 | 0.953 | 9.68 | 85.80 | 0.073 | 14.79 | 123.43 |
| 8* | 920 | 7508 | 8.90 | 6.91 | 2.08 | 61.99 | 13.2 | 0 | 85.80 | 0.072 | 17.23 | 140.66 |

| Day | Volume Treated | Cumulative Volume Treated | pH | Dissolved Arsenic | | | Dissolved Mercury | | | Dissolved Zinc | | |
|---|---|---|---|---|---|---|---|---|---|---|---|---|
| | | | | mg/l | mg | mg | mg/l | mg | mg | mg/l | mg | mg |
| 1 | 0 | 0 | 8.5 | 1.4 | 0 | 0 | .40 | 0 | 0 | 9.01 | 0 | 0 |
| 2 | 125 | 125 | 8.9 | 0.001 | 0.18 | 0.18 | 0.0037 | 0.05 | 0.05 | 0.015 | 1.12 | 1.12 |
| 3 | 838 | 963 | 9.25 | 0.001 | 1.17 | 1.35 | 0.006 | 0.34 | 0.39 | 0.064 | 7.50 | 8.62 |
| 4 | 793 | 1756 | 9.05 | <0.001 | 1.11 | 2.46 | 0.006 | 0.32 | 0.71 | 0.077 | 8.95 | 17.57 |
| 5 | 545 | 2301 | 9.00 | <0.001 | 0.76 | 3.22 | 0.019 | 0.21 | 0.92 | 0.061 | 4.88 | 22.45 |
| 6 | 1610 | 3911 | 9.00 | <0.001 | 2.25 | 5.47 | <0.0005 | 0.64 | 1.56 | 0.062 | 14.41 | 36.86 |
| 7 | 1887 | 5798 | 8.95 | <0.001 | 2.64 | 8.11 | <0.0005 | 0.75 | 2.31 | 0.052 | 16.90 | 53.76 |
| 8 | 790 | 6588 | 8.95 | <0.001 | 1.11 | 9.22 | <0.0005 | 0.32 | 2.63 | 0.036 | 7.09 | 60.85 |
| 8* | 920 | 7508 | 8.90 | <0.001 | 1.29 | 10.51 | <0.0005 | 0.37 | 3.00 | 0.790 | 7.55 | 68.41 |

*This run was conducted by increasing the flow rate on the eigth day to 15.2 milliliters per minute, thereby providing a contact time of 21.4 minutes. The balance of the runs were conducted at a contact time of 6.7 hours.

These results demonstrate the following:
1. Metal adsorption varies with the type of wastewater.
2. Adsorption capacity of the activated bed of iron filings varies for different metals. It has least affinity for nickel amongst the metals studied.
3. The contact period required for efficient adsorption also varies with the metal.

Reducing the contact to 20 minutes does not affect the removal of copper, chromium, arsenic and mercury. It slightly reduces the removal efficiency of zinc; and cadmium and lead removals are significantly reduced. Example 5 also demonstrates that, depending upon the tupe of metal to be removed from the wastewater, the iron filing requirement and contact time can be developed to suit individual needs and can best be established empirically.

From the detailed description and examples, it will be apparent to those skilled in the art that the objects of the invention have been achieved. While only certain embodiments have been set forth, alternative embodiments and various modifications will be apparent from the above description to those skilled in the art. Thus, as above indicated, while the drawings and Examples 4 and 5 are directed to a continuous flow-through operation, the twostep process of activation and treatment also readily lends itself to batch operation. These and other alternatives are considered equivalents and within the scope and spirit of the present invention.

Having described the invention, what is claimed is:

1. An environmentally-compatible process for removal of toxic heavy metals from an aqueous effluent comprising the steps of:
   (a) contacting a bed of at least 50% by weight pure iron in particulate form, 50% or more of which has a mesh size in the range of about 2½ to 200 (U.S. Standard Sieve Series), with an oxygen-containing medium and an aqueous medium at a temperature in the range of about 40° F. to 140° F. and a pH in the range of about 7 to 10 under conditions providing an oxygen-water-iron interface without agitation of said bed for a period sufficient to react at least a substantial portion of the exposed iron surfaces of the particulates in said bed with the oxygen and water so as to produce active surfaces on the iron particles having enhanced adsorption for said heavy metals;
   (b) thereafter, without allowing the active adsorptive surfaces so formed to dry, inundating the particulates with said aqueous effluent at a temperature in the range of about 40° F. to 140° F. and a pH in the range of about 7 to 10 so as to bring about intimate contact of the aqueous effluent and adsorptive surfaces to effect adsorption of at least a substantial portion of said heavy metals in the aqueous effluent on to said adsorptive surfaces; and
   (c) separating the contacted aqueous effluent having reduced amounts of heavy metal from the bed of iron particulates having heavy metals adsorbed thereon.

2. The process of claim 1 including the step of periodically replacing the bed of spent iron particulates having adsorbed heavy metals thereon with a bed of fresh at least 50% by weight pure iron in particulate form and repeating steps (a), (b) and (c).

3. The process of claim 1 wherein said oxygen-containing medium is air.

4. The process of claim 1 wherein said aqueous medium is said aqueous effluent.

5. The process of claim 1 wherein said active surfaces having enhanced adsorption comprise ferric oxyhydroxide.

6. The process of claim 1 including the step of charging the spent iron having adsorbed heavy metal thereon as raw material to a steelmaking process.

7. An environmentally-compatible process for removal of toxic heavy metals from an aqueous effluent comprising the steps of:
   (a) contacting a bed of at least 50% by weight iron particles, 50% or more of which has a mesh size in the range of about 2½ to 200 (U.S. Standard Sieve Series), with air and said aqueous effluent at a pH in the range of about 7 to 10 and a temperature in the range of about 40° F. to 140° F. and under conditions providing an oxygen-water-iron interface without agitation of the iron particles in said bed for a period sufficient to react at least a substantial amount of the iron with the oxygen and water so as to produce active surfaces on the iron particles having enhanced adsorption for said heavy metals;
   (b) thereafter, without allowing the active adsorptive surfaces so formed to dry and without agitation of the iron particles in said bed, inundating the activated iron particles so as to bring about intimate contact of the adsorptive surfaces and said aqueous effluent at a temperature in the range of about 40° F. to 140° F. and at a pH in the range of about 7 to 10 for a period sufficient for at least a substantial portion of said heavy metals to be adsorbed on to said adsorptive surfaces;
   (c) separating the contacted aqueous effluent having reduced amounts of heavy metals from the bed of iron particles having the heavy metals adsorbed thereon;
   (d) periodically replacing the bed of iron particles after exhaustion with a fresh bed of at least 50% by weight iron particles, 50% or more of which has a mesh size in the range of about 2½ to 200 (U.S. Standard Sieve Series), and repeating steps (a), (b) and (c) with same.

8. The process of claim 7, including the step of recycling at least a portion of the separated aqueous effluent from step (c) back to step (b) so as to increase the amount of toxic metals removed.

9. The process of claim 7 wherein a plurality of beds of said iron particles are provided in parallel flow relationship and steps (a), (b) and (c) are carried out in each bed.

10. The process of claim 9 wherein the replacement of a bed of exhausted iron particles with a fresh bed of at least 50% by weight iron particles of step (d) is carried out in at least one bed while steps (a), (b) and (c) are carried out in the other of said plurality of beds.

11. The process of claim 7 wherein a plurality of beds of said iron particles are provided in series flow relationship and steps (a), (b) and (c) are carried out in each bed whereby the toxic metal content of the effluent is progressively lowered.

12. The process of claim 11 wherein the replacement of a bed of exhausted iron particles with a fresh bed of at least 50% by weight iron particles of step (d) is carried out in at least one bed while steps (a), (b) and (c) are carried out in the other of said plurality of beds.

13. An environmentally-compatible process for the removal of toxic heavy metals from aqueous effluent comprising the steps of:
   (a) providing a bed of iron particulates having at least 50% by weight pure iron, 50% or more of the particulates having a mesh size in the range of about 10 to 80 (U.S. Standard Sieve Series);
   (b) flowing an aqueous medium at a temperature in the range of about 40° F. to 140° F. and a pH in the range of about 7 to 10 upwardly through said bed in the presence of air so as to form an upwardly rising interface of iron particulates, air and aqueous medium for a period sufficient to react at least a substantial portion of the iron particulates with oxygen and water so as to form active iron surfaces having enhanced adsorptive properties for said heavy metals, the flow rate of said aqueous medium being insufficient to cause agitation of said bed or entrainment of said iron particulates in said aqueous medium;

(c) thereafter and without allowing the adsorptive surfaces so formed to dry, flowing the aqueous effluent to be treated through the bed at a temperature in the range of about 40° F. to 140° F. and a pH in the range of about 7 to 10, whereby the iron particulates with adsorptive surfaces intimately contact the effluent and toxic heavy metals are adsorbed on said adsorptive surfaces;

(d) periodically discontinuing the flow of aqueous effluent through the bed, replacing the exhausted bed with a fresh bed of particulates as in step (a), and repeating steps (b), (c) and (d); and (e) disposing of the exhausted bed having adsorbed heavy metals thereon as a scrap iron charge to other processing.

14. The process of claim 13, including the step of recycling at least a portion of the treated aqueous effluent to step (c) so as to increase the amount of toxic metals removed.

15. The process of claim 13 wherein a plurality of beds of said particulates are provided in parallel flow relationship and steps (b), (c) and (d) are carried out in each bed.

16. The process of claim 15 wherein bed replacement of step (d) and step (a) are carried out in at least one bed while steps (b) and (c) are carried out in the other of said plurality of beds.

17. The process of claim 13 wherein a plurality of beds of said particulates are provided in series flow relationship and steps (b), (c) and (d) are carried out in each bed whereby the toxic metal content of the effluent is progressively lowered.

18. The process of claim 17 wherein bed replacement of step (d) and step (a) are carried out in at least one bed while steps (b) and (c) are carried out in the other of said plurality of beds.

* * * * *